United States Patent [19]
Deppe et al.

[11] Patent Number: 5,304,099
[45] Date of Patent: Apr. 19, 1994

[54] HYDRAULIC CHAIN TENSIONER

[75] Inventors: David W. Deppe; Richard L. Madden, both of Marshall, Mich.

[73] Assignee: Eaton Corporation, Cleveland, Ohio

[21] Appl. No.: 31,188

[22] Filed: Mar. 12, 1993

[51] Int. Cl.$^5$ .............................................. F16H 7/08
[52] U.S. Cl. .................................................. 474/110
[58] Field of Search ........................ 474/101, 109–111, 474/113–117, 133–138

[56] References Cited

U.S. PATENT DOCUMENTS

| | | | |
|---|---|---|---|
| 3,011,485 | 12/1961 | Van Slooten | 123/90 |
| 4,772,251 | 9/1988 | Goppelt et al. | 474/101 |
| 4,874,352 | 10/1989 | Suzuki | 474/110 |
| 4,985,009 | 1/1991 | Schmidt et al. | 474/110 |
| 5,030,169 | 7/1991 | Kiso et al. | 474/110 |
| 5,073,150 | 12/1991 | Shimaya | 474/110 |
| 5,087,225 | 2/1992 | Futami et al. | 474/110 X |
| 5,181,889 | 1/1993 | Maruyama et al. | 474/110 |

Primary Examiner—Thuy M. Bui
Attorney, Agent, or Firm—F. M. Sajovec

[57] ABSTRACT

A hydraulic chain tensioner including a retractable ratchet mechanism. A ratchet pawl in the form of a cylindrical plunger received in a bore formed in the tensioner housing is normally biased into engagement with grooves formed on the output member of the tensioner. The bore is in communication with a source of pressurized engine oil so that when the engine is operating the force produced by the oil pressure acting against the plunger overcomes the biasing force and disengages the plunger from the output member. When the engine is stopped the oil pressure goes to zero and the biasing force is again effective to move the plunger into engagement with the output member to maintain its axial position.

9 Claims, 1 Drawing Sheet

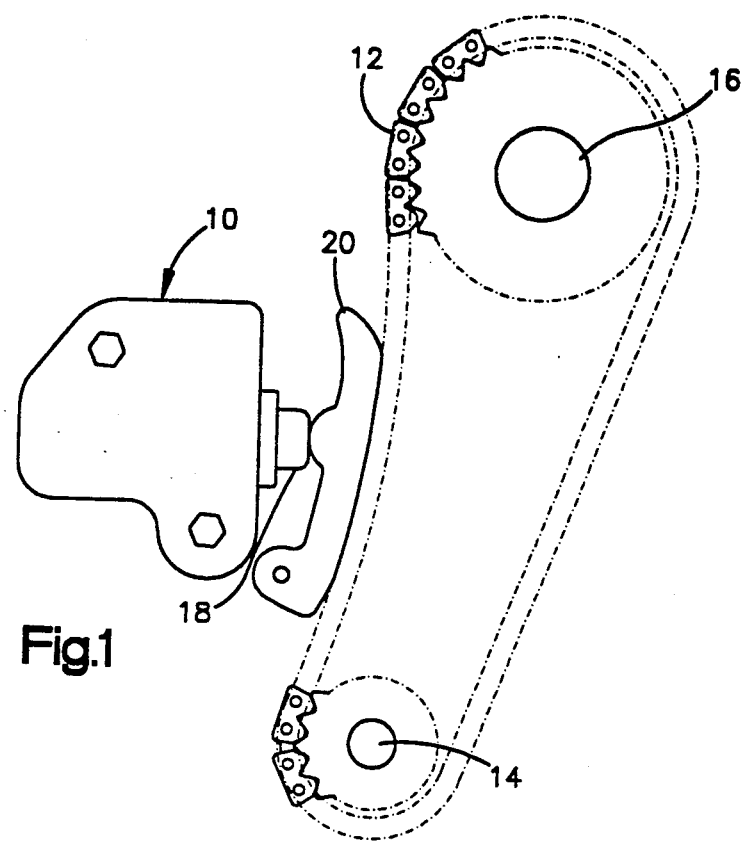
Fig.1
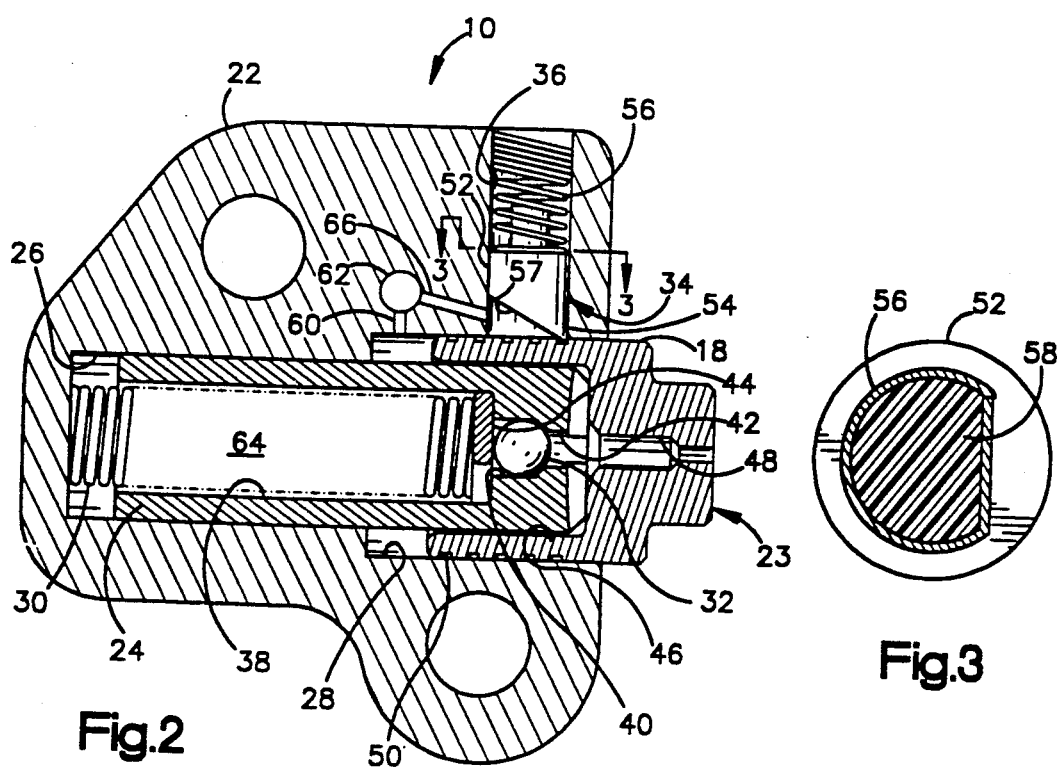
Fig.2
Fig.3

HYDRAULIC CHAIN TENSIONER

The present invention relates to chain tensioners and more particularly to a ratchet mechanism for a hydraulic chain tensioner.

Chain tensioners are well know in the art, particularly those wherein a hydraulic module is employed to provide a force directly against a movable guide which bears against the timing chain of an internal combustion engine to take up slack in the timing chain. An example of such a tensioner is shown in U.S. Pat. No. 4,874,352 to Suzuki. Typical examples of hydraulic modules for such tensioners are shown in U.S. Pat. No. 4,894,047 to Breon et al and U.S. Pat. No. 4,997,411 to Breon et al, both of which are incorporated herein by reference.

In a typical hydraulic chain tensioner, an output member is biased in a protruding direction against the chain guide by the combined force of a spring and hydraulic pressure to maintain a predetermined tension in the chain. A check valve in the hydraulic circuit of the tensioner prevents retraction of the output member under conditions wherein the force exerted on the chain guide by the chain exceeds the spring force. When the engine is shut down and no oil pressure is present in the tensioner, the output member can retract, allowing the chain to slacken, resulting in noise and vibration on start-up until sufficient hydraulic pressure is built up to again maintain the predetermined chain tension.

To maintain chain tension during engine shut-down, current hydraulic tensioners include mechanical ratchet mechanisms acting on the output member, as exemplified by the tensioner shown in U.S. Pat. No. 4,874,352. Such ratchet mechanisms are spring-loaded into constant engagement with the output member and thus are subjected to all the forces and force variations to which the tensioner components are subjected while the engine is running. Accordingly, the ratchet mechanism must be rather robust in construction, requiring significant additional space in an environment wherein space is generally at a premium.

The present invention takes advantage of the fact that the ratchet function is only required when the engine is shut down, and thus provides a retractable ratchet which engages the output member when the engine is shut down to maintain the position of the tensioner and thus the chain tension, but which retracts when the engine is operating. Because of this manner of operation, the ratchet mechanism does not have to be designed to withstand the operating conditions to which the tensioner is subjected, as described above. In accordance with the invention, the ratchet is in the form of a hydraulic plunger which is spring-loaded into engagement with the output member, and which is disengaged by engine oil pressure acting on the plunger to overcome the spring force. Accordingly, when the engine is operating, the ratchet is disengaged, and when the engine is shut down the ratchet engages to maintain the tensioner in an operative position during such shut down.

Other objectives and advantages of the invention will be apparent from the following description when considered in relation to the accompanying drawing, wherein:

FIG. 1 is a schematic elevation view illustrating the application of the invention to an internal combustion engine:

FIG. 2 is a cross-sectional view of the invention; and

FIG. 3 is a sectional view taken along line 3—3 of FIG. 2.

It should be appreciated that while the present invention is described herein as applied to a chain drive system, it is also applicable to other endless belt-type power transmission systems such as, for example, a toothed belt system.

Referring to FIG. 1, there is illustrated a chain tensioner assembly 10 bolted or otherwise attached to an internal combustion engine (not shown) in position to maintain tension in a timing chain 12 connecting the crankshaft 14 of the engine to a camshaft 16. In the typical application illustrated, an output element or sleeve 18 of the chain tensioner assembly bears against a pivotally mounted chain guide 20 which bears against the outside of the chain to apply a tensioning force thereto.

Referring to FIG. 2, the chain tensioner assembly comprises a housing 22; and a hydraulic module 23 comprising a dynamic plunger 24 received in a blind bore 26 formed in the housing, the sleeve 18 received in a counterbore 28 formed in the housing, a spring 30 acting between the housing and the plunger and biasing the plunger outward of the bore, a check ball 32 in the plunger, and a ratchet assembly 34 received in a cross bore 36 formed in the housing and intersecting the counterbore 28.

The dynamic plunger 24 is an elongated cylindrical member having a first bore 38 in which the spring 30 is received, a second bore 40 in which the check ball is received, and a third bore 42, extending through the end of the plunger, the intersection between the second and third bore defining a seat for the check ball. The check ball is retained by a perforated disk 44 press fit into the first bore, and the spring 30 bears against the disk. The fit between the outer diameter of the plunger and the bore 26 defines a controlled leakdown surface as is well know in the design of hydraulic tensioners.

The sleeve 18 is a cup-shaped member having a first bore 46 into which a portion of the plunger 24 extends, and a stepped bore 48 extending through the bottom end thereof. Ratchet teeth in the form of plurality of circumferential grooves 50 are formed in the outside diameter of the sleeve for engagement by the ratchet assembly.

In accordance with the invention, the ratchet assembly 34 comprises a ratchet pawl in the form of a plunger 56 received in the bore 36 and having an angled end face 57 formed thereon to define a projecting pawl tooth 54 engageable with the grooves 50, and a spring 56 biasing the ratchet plunger into engagement with the sleeve. The last few turns on the outer end of spring 56 are closely wound and to a larger diameter than the rest of the spring, and are in interference fit with the bore 36, thus serving to retain the ratchet assembly in a fixed axial and angular position within the bore. Referring to FIG. 3, the ratchet plunger 52 has a D-shaped projection 58 formed thereon, and the end coil of the spring 56, which fits over the projection, is similarly D-shaped to maintain the angular position of the ratchet plunger.

It can be appreciated that the present invention provides a very simple and effective ratchet pawl design which can be applied to other hydraulic devices wherein it is desired to selectively actuate the pawl by means of hydraulic pressure.

Referring again to FIG. 2, pressurized engine oil enters the volume defined by the counterbore 28 through a port 60 intersecting an oil gallery 62 which is in communication with the engine oil supply. Oil flows between the dynamic plunger 24 and the sleeve 18 to the check ball and also through the stepped bore 48 to provide lubrication for the chain.

When the chain 12 slackens, the plunger spring 30 extends the dynamic plunger and the sleeve, creating a low pressure in the chamber 64 defined by the bores 26 and 38, which causes the check ball to unseat, allowing oil to flow into the chamber. When the chain tightens, a force is applied to the sleeve causing the sleeve and the dynamic plunger to move inward of the housing. This downward motion causes a pressure rise in the chamber 64, causing the check ball to reseat and stop the flow of oil into the chamber. As the load applied to the sleeve increases, the pressure in the chamber 64 increases due to the fact that it is sealed except for a small amount of oil which leaks past the leakdown surface between the plunger and the bore 26. The resultant high pressure in the chamber 64 resists the inward motion of the sleeve and plunger, maintaining the tension in the chain 12.

When the engine is shut down, and the supply of pressurized oil is cut off, the static load of the chain acting on the sleeve 18 will be greater than the force of the spring 30, causing the tensioner to collapse. If such collapse is left unchecked, the excess slack which is produced in the chain can cause excessive chain noise and possible slippage of the timing drive when the engine is restarted.

In accordance with the invention, pressurized oil is supplied to the volume defined under the angled face 57 of the ratchet plunger through a port 66 communicating with the gallery 62. When the engine is running, the oil pressure acting against the face of the ratchet plunger will exceed the force of the ratchet spring causing the pawl tooth 54 to become disengaged from the sleeve 18. Accordingly, so long as the engine is running and oil pressure is maintained, the ratchet assembly will remain disengaged and will not affect the normal operation of the chain tensioner. When the engine is shut down and oil pressure is no longer maintained at the face of the ratchet plunger, the spring 56 will again be effective to bias the plunger 52 into engagement with the sleeve 18. As the sleeve collapses inward under the force of the chain, the pawl tooth 54 will engage one of the grooves 50, preventing further collapse of the sleeve and maintaining that position of the tensioner until the engine is restarted.

We claim:

1. In a hydraulic tensioner for an internal combustion engine comprising a housing; a hydraulic tensioner module received within said housing, said module including an axially extendible and retractable output member operatively engageable with an endless drive element of said engine; inhibiting means engageable with said output member to inhibit retraction of said output member; and means for disengaging said inhibiting means when said engine is operating.

2. Apparatus as claimed in claim 1, wherein said inhibiting means comprises ratchet means operatively associated with said output member.

3. Apparatus as claimed in claim 2, in which said ratchet means comprises means defining ratchet teeth formed on said output member, means defining a ratchet pawl received in said housing and engageable with said teeth means, and means biasing said ratchet pawl means into engagement with said teeth means.

4. Apparatus as claimed in claim 3, wherein said means defining a ratchet pawl comprise a cylindrical plunger received in a bore formed in said housing and having a tooth-engaging projection formed on one end thereof, and wherein said biasing means comprises a spring acting between said housing and the opposite end of said cylindrical plunger.

5. Apparatus as claimed in any one of claims 1 through 4, in which said means for disengaging said inhibiting means includes means responsive to engine oil pressure, said oil pressure being effective to disengage said inhibiting means when the engine is operating and ineffective to disengage said inhibiting means when said engine is not operating.

6. Apparatus as claimed in claim 4, wherein said means for disengaging said inhibiting means comprises means connecting said bore to a source of pressurized engine oil.

7. Apparatus as claimed in claim 6, including means for distributing pressurized engine oil within said housing, said means connecting said bore to said source of pressurized engine oil comprising a port connecting said bore to said distributing means.

8. Apparatus as claimed in claim 4, in which said spring is a coil spring; said plunger has an axial projection formed thereon, said axial projection having at least one flat formed thereon; said spring is received over said projection and has a portion of at least one coil shaped to conform to said at least one flat to prevent relative rotation between said spring and said plunger; and said spring has at least one coil thereof in interference fit with said bore.

9. In a hydraulic device including a housing, a source of hydraulic pressure within said housing, an extensible member received within said housing, and ratchet teeth means formed on said extensible member; a ratchet pawl assembly received in said housing and engageable with said extensible member, said ratchet pawl assembly comprising a cylindrical plunger received in a bore formed in said housing and having a pawl tooth formed on one end thereof and an axial projection having at least one flat formed thereon formed on the opposite end thereof; and a coil spring received within said bore, said spring having at least one coil thereof in interference fit with said bore and at least one coil thereof shaped to conform to said at least one flat.

* * * * *